Jan. 2, 1945.   R. FAUSER   2,366,247
MACHINE FOR CUTTING METAL PARTS
Filed June 24, 1943   4 Sheets-Sheet 1
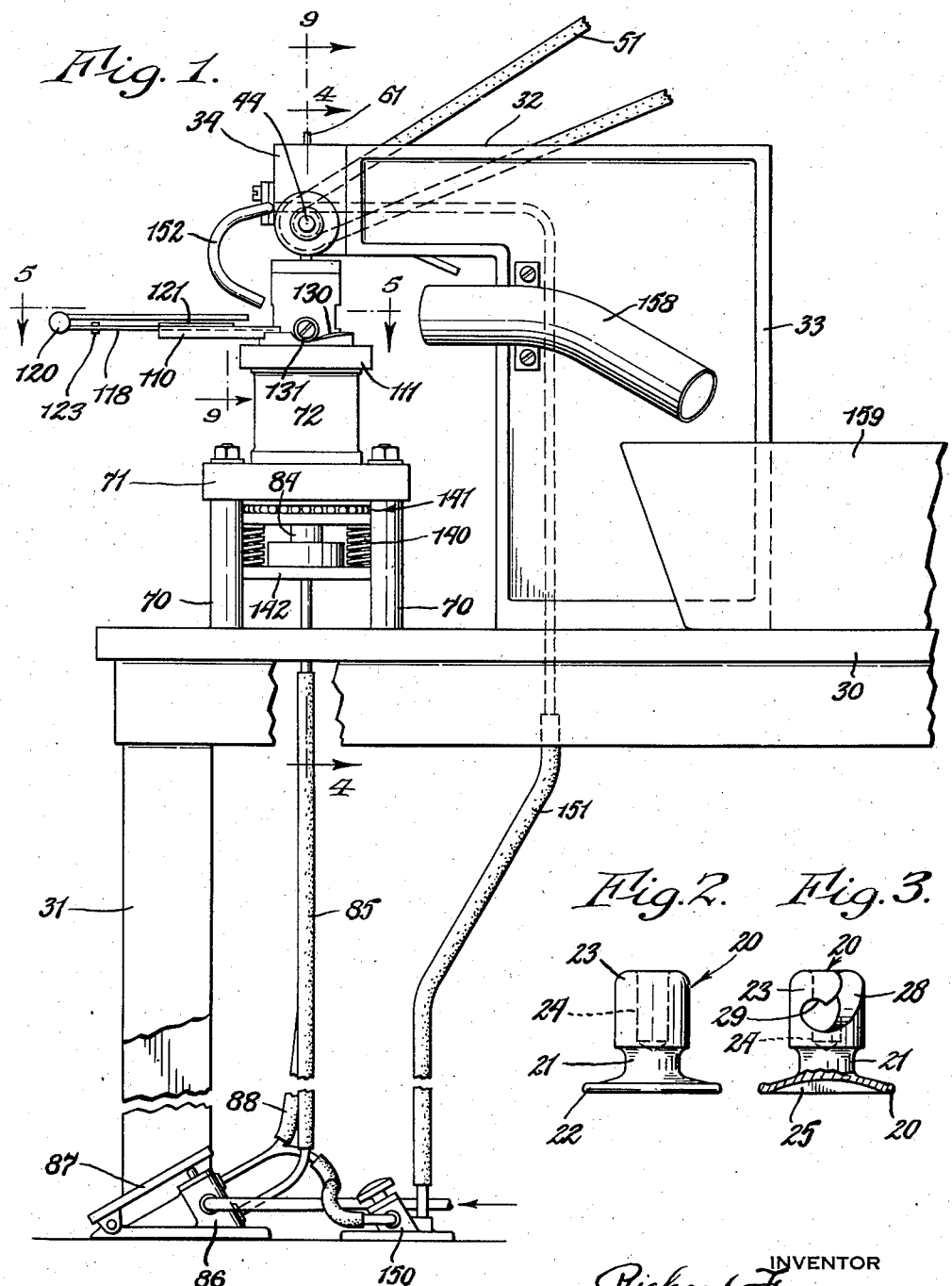
INVENTOR
Richard Fauser
BY
Popp and Popp
ATTORNEYS

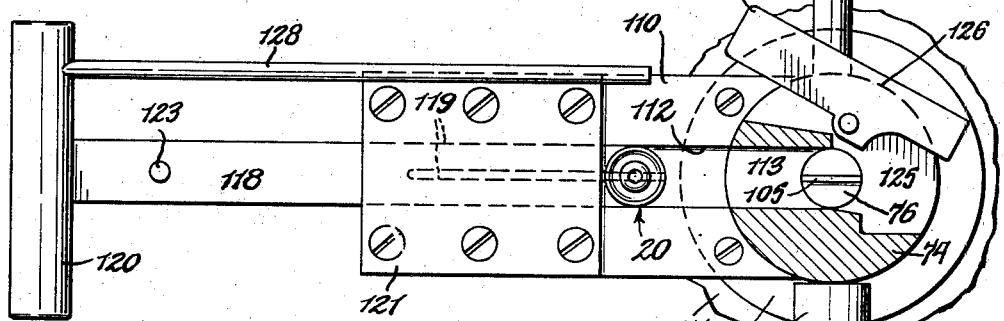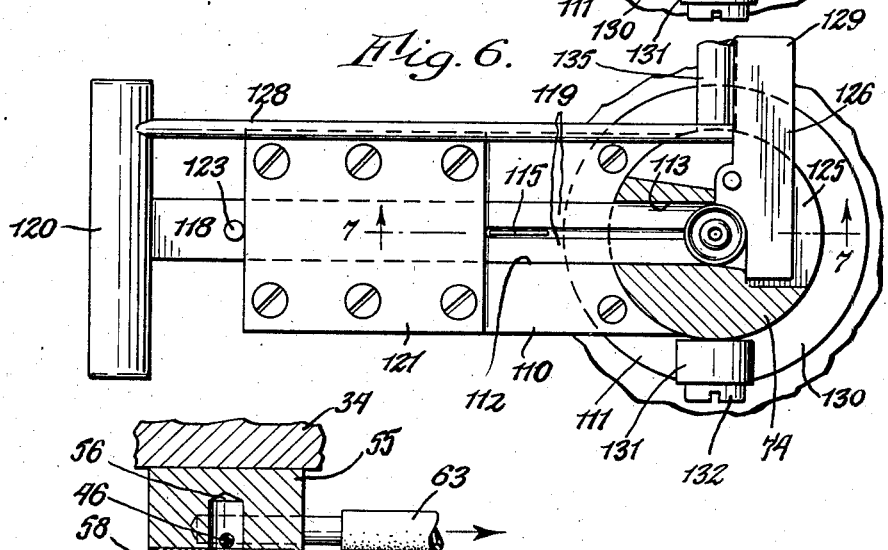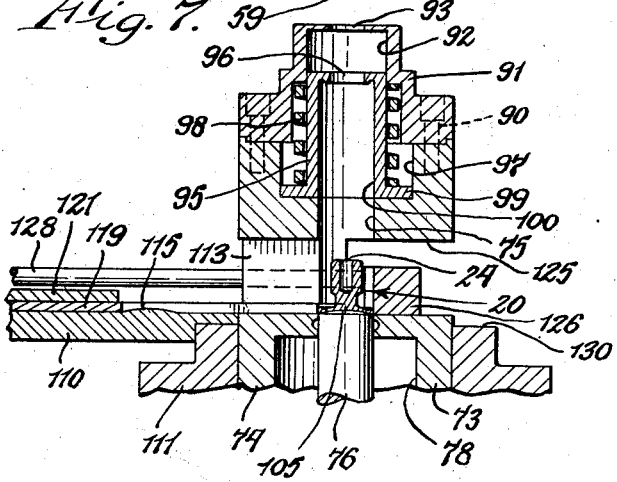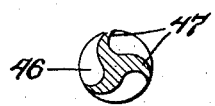

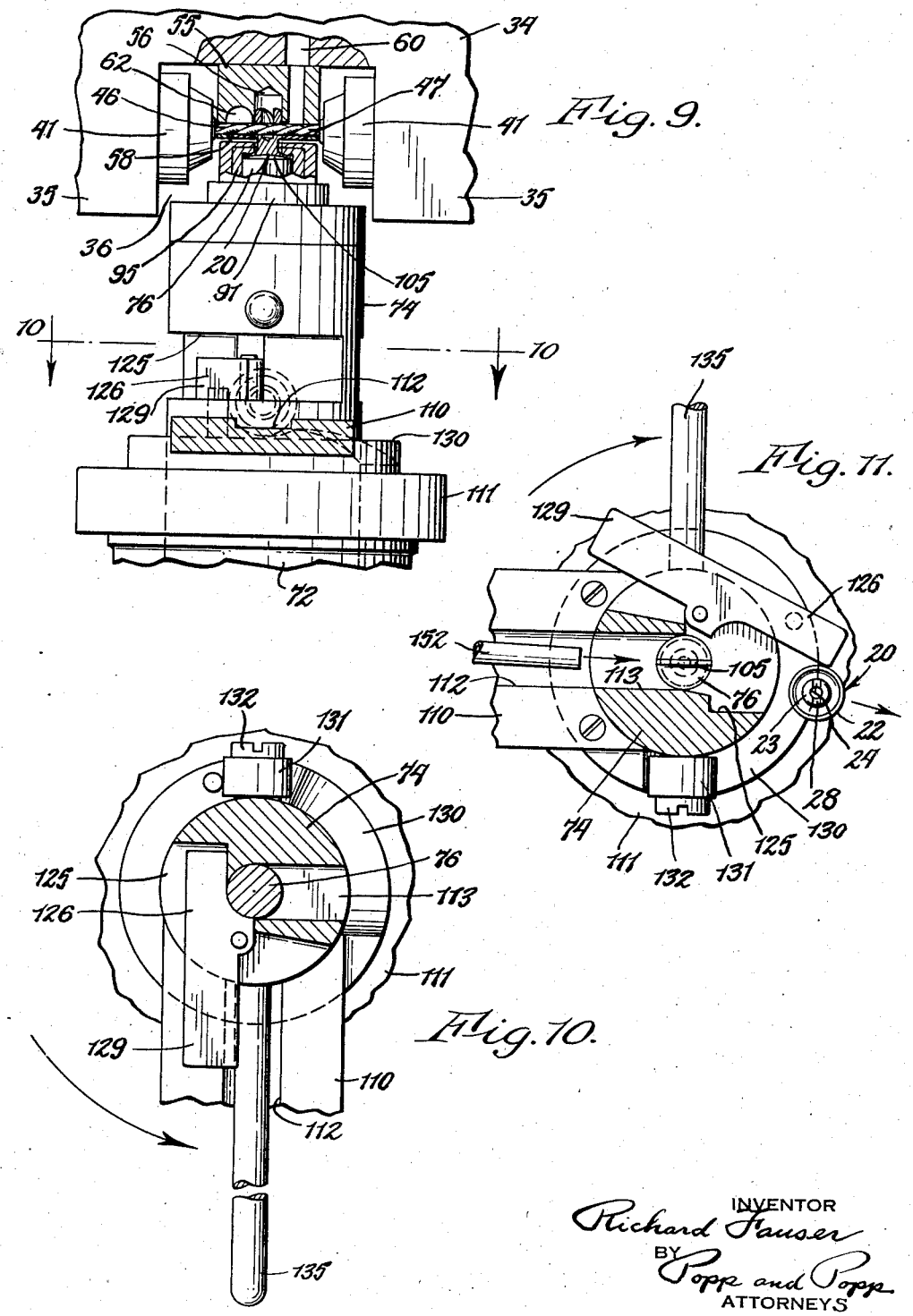

Patented Jan. 2, 1945

2,366,247

UNITED STATES PATENT OFFICE 2,366,247

MACHINE FOR CUTTING METAL PARTS

Richard Fauser, Kenmore, N. Y., assignor to M S W Manufacturing Company, Incorporated, Buffalo, N. Y., a corporation of New York Application June 24, 1943, Serial No. 492,090

16 Claims. (Cl. 90—13.9)

This invention relates to a machine for cutting metal fittings and more particularly to a machine for cutting bayonet slots in pins which are used as a part of fasteners in holding sheet metal parts together, such as the sheet metal parts of an airplane fuselage.

One of the principal objects of the invention is to provide such a machine which is adapted to handle fittings of the particular shape shown and which will accurately cut a bayonet slot of predetermined form and in predetermined relation to a screw driver slot previously formed in the pin.

Another object is to provide such a machine in which the fittings can be easily fed to the machine and in which the difficult operations are taken care of automatically, the machine not being, however, completely automatic, it having been found that fittings can be produced at a higher speed and with greater accuracy with semi-automatic operation.

Another purpose is to provide such a machine in which an adequate amount of cutting oil is fed during the cutting operation to facilitate the cutting and absorb heat but in which the cutting oil is kept in a substantially closed circuit so that only a small amount of oil can escape, either as leakage or with the finished product.

Another aim is to provide such a machine which is adequately guarded so as to avoid danger of injury to the operator but which is at the same time readily accessible for repair or adjustment.

Another object is to provide such a machine which can readily be adjusted to produce similar parts of different sizes, thereby to avoid too highly specialized a machine and to extend its use.

Another object is to provide a rotary cutter particularly applicable for cutting such slots.

Another object is to provide such a machine in which the finished product is quickly ejected and restored for operation on the next piece.

Another object is to provide such a machine which is simple in construction, considering the function it performs, which is reliable in operation, which can be run by unskilled labor and which will stand up under conditions of severe and constant use without getting out of order or requiring repairs.

In the accompanying drawings:

Fig. 1 is a side elevation of a machine for cutting metal fittings and embodying my invention.

Fig. 2 is a side elevation of the blank fitting on which the machine operates.

Fig. 3 is a similar side elevation showing the finished product of the machine.

Fig. 5 is an enlarged horizontal fragmentary section, taken on line 5—5, Fig. 1 and showing one position of the parts.

Fig. 6 is a view similar to Fig. 5 and showing another position of the parts.

Fig. 7 is a fragmentary vertical section, taken on line 7—7, Fig. 6.

Fig. 8 is a greatly enlarged vertical transverse section through the center of the cutter used in cutting the bayonet slot.

Fig. 9 is an enlarged vertical fragmentary section, taken on line 9—9, Fig. 1.

Fig. 10 is a fragmentary horizontal section, taken on line 10—10, Fig. 9.

Fig. 11 is a view similar to Fig. 10 but showing another position of the parts.

Figure 4:
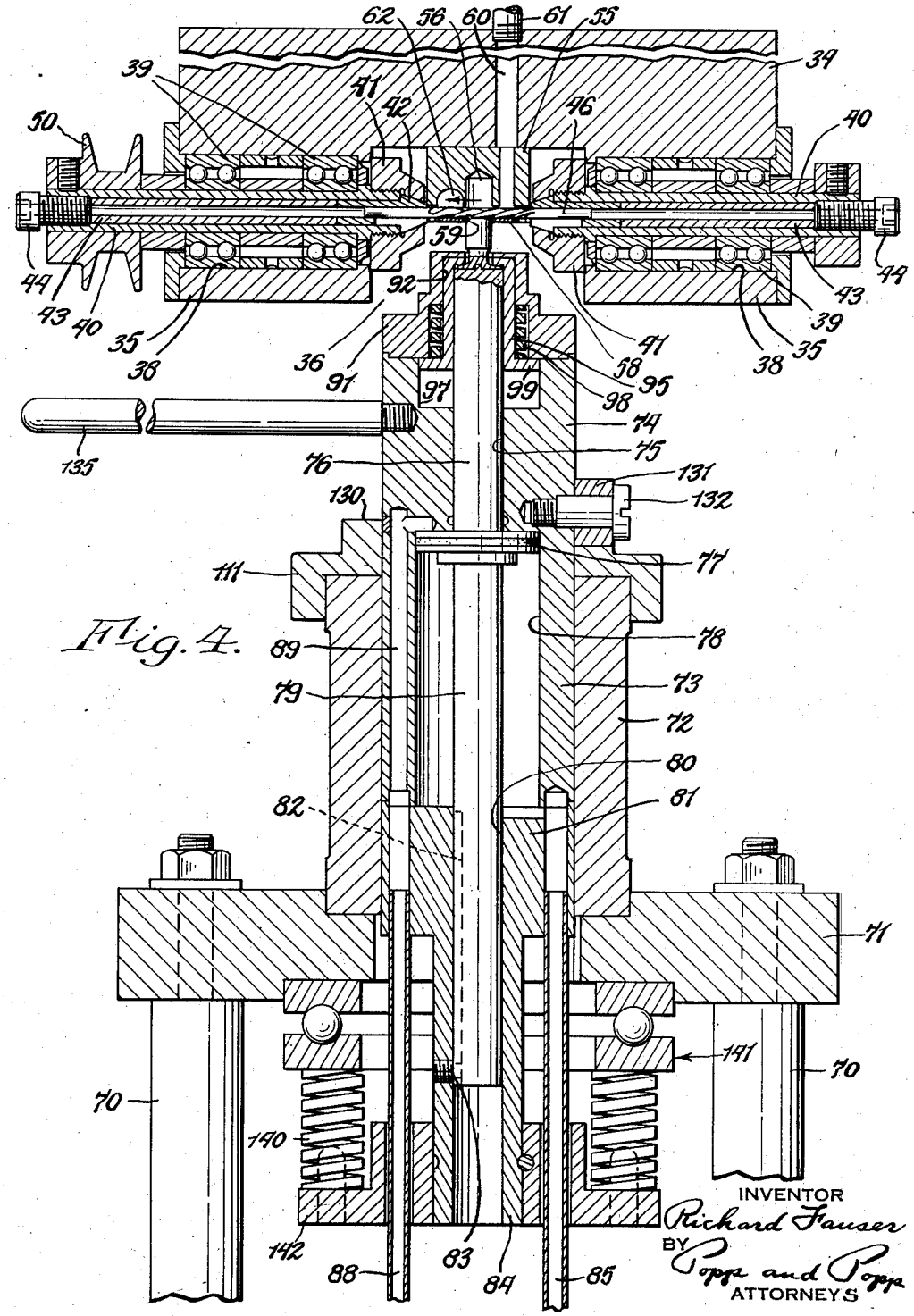
Fig. 4 is an enlarged vertical fragmentary section, taken on line 4—4, Fig. 1.

The metal fitting in which the machine embodying the present invention is used to cut a bayonet slot therein is, as best shown in Figs. 2 and 3, a collar button-like pin 20 having a reduced shank 21, a comparatively thin radially extending annular flange 22 at one end and a cylindrical coaxial head 23 at its opposite end. The blank shown in Fig. 2 has its head 23 provided with an axial bore 24 extending inwardly from its end to as far as the reduced shank 21 of the pin, and the end forming the flange 22 is provided, as best shown in Figs. 4, 7 and 9, with a screw driver slot 25 by means of which the pin can be turned in applying it as a fastener. It will be particularly noted that this screw driver slot is not a straight slot but is of rounding form, the slot, as best shown in Fig. 3, being deep at its center and as tapering at its ends to join the flat end surface of the end flange 22 of the pin. The fitting as shown in Figs. 2 and 3 is enlarged.

The machine embodying the invention cuts a bayonet slot 28 in the pin 20, as best shown in Fig. 3. This bayonet slot extends the full width of the head 23 of the pin and intersects the bore 24 therein. This bayonet slot starts at the outer end of the head 23 and in alinement with the axis of the head and extends thence both axially and circumferentially of this end head and terminates in a reversely formed locking end portion 29 of the bayonet slot. The pin 20 so provided with the bayonet slot 28 is used as part of a fitting for securing sheet metal panels, the other parts of the fitting not being shown.

The machine embodying the invention is shown as mounted on a stand 30 supported by legs 31, the rotary cutter assembly for cutting the bayonet slot 28 being shown as mounted on the forwardly projecting arm 32 of a standard 33 secured to the stand 30.

As best shown in Figs. 1, 4, 7 and 9, this cutter assembly includes a head 34 which is secured to the front end of the arm 32 of the standard 33 in any suitable manner and has a pair of spaced depending side portions 35 defining a working space 36 therebetween. Each of these side portions 35 is provided with a horizontal bore 38, the bores 38 extending through to the working space 36 and alining with each other. In each of the bores 38 is secured a pair of spaced roller bearings 39, each pair of these roller bearings 39 carrying a tubular spindle 40, the opposing ends of these tubular spindles being threaded to carry a chuck head 41 having a tapering bore into which is fitted the enlarged tapered head of a tubular split chuck jaw 42. The shank of each of these tubular split chuck jaws 42 is fitted into the bore of the corresponding tubular spindle 40 and against the end of a tube 43, each of these tubes being forced inwardly by means of a screw 44 threadedly fitted in the end of the corresponding tubular spindle 40. The cutter 46 is shown as made of hardened drill rod, this rod being shown as provided at its center with three spiral cutting teeth 47 as best shown in Fig. 8. The spiral cutting teeth are provided only at the center of the rod and the ends of the cutting rod are gripped by the split chuck jaws 42, the central cutting portion of the cutter 46 being thereby held in the center of the working space 36 between the depending portions 35 of the supporting head 34.

The cutter 46 is released from the chuck jaws 42 by removing the screws 44 at the ends of the tubular spindles 40. This releases the end pressure on the two tubes 43 and thereby permits the two tubular split conical chuck jaws 42 to back away from the conical face of the chuck heads 41. This permits the tubular split chuck jaws to open up and release the ends of the cutter 46, following which the cutter can be pushed out through the bores of the split chuck jaws 42 and tubes 43, another cutter 46 being replaceable in like manner.

The tubular spindles 40 are rotated in their ball bearings 39 to rotate the cutter 46 held by the chuck jaws at the inner ends of these spindles. For this purpose the spindles 40 are held against axial movement in any suitable manner and one of the spindles has fixed thereto a pulley 50 which is driven, through a belt 51, from any suitable source of power (not shown). The spindles and cutter are rotated in a direction to carry the chips to the left, as viewed in Fig. 4, and the discharge of chips is further facilitated by a stream of cutting oil and the application of suction to the working space, this suction also preventing any substantial amount of the cutting oil from dripping from the working space either during or following the cutting operation. This application of suction to remove the cutting oil and the chips is particularly important in the present machine as the bayonet slot is cut downwardly into the blank which is presented from underneath the cutter as hereinafter described.

To provide for the application of cutting oil to the cutter 46 and the removal of this oil and the chips by suction, a block 55, as best shown in Figs. 4 and 7, is secured to the underside of the head 34 within the working space 36 and is provided on its underside with a groove in which the cutter rod 46 rotates and is also provided with a central bore 56 into which the blank or workpiece 20 is projected upwardly while the cutter 46 is cutting a bayonet slot therein. On the underside of this block is removably secured, in any suitable manner, a small square or piece 58 of sheet metal, this piece of sheet metal having an opening 59 in line with the central bore 56 of the block 55 and through which the blank or workpiece is projected upwardly to be operated upon by the cutter 46, the cutter, arranged in the groove provided in the underside of the block 55, being enclosed by the piece 58 of sheet metal so as to work in a small chamber. Leading to the right hand end of this chamber, as viewed in Fig. 4, is a cutting oil supply duct 60 which is supplied with oil under pressure from an oil supply line 61, and leading from the left hand end of this chamber, as viewed in this same figure, is a vacuum duct 62 which, as best shown in Fig. 7, extends horizontally and connects with a vacuum or suction line 63. A substantial flow of cutting oil therefore flows along the cutter 46 while the same is operating on the workpiece in the direction of the arrow shown in Fig. 4, and this cutting oil and the chips resulting from the cutting operation are immediately drawn into the vacuum line, following which the chips and oil are separated in the usual manner and the oil recirculated through the apparatus. By the use of vacuum there is substantially no escape of cutting oil from around the cutter even when the central opening in the piece 58 of sheet metal is open. When the workpiece is not arranged in this opening air is drawn in through this opening along with cutting oil from the supply duct 60 and the escape of oil is therefore not permitted. The workpiece is moved upwardly through the opening in the center of the piece 58 of sheet metal and into engagement with the cutter 46 by a pneumatic lift which is preferably constructed as follows:

Mounted on four posts 70 below the head 34 is a plate 71 carrying a vertical sleeve 72 in the bore of which a cylinder 73 is mounted, this cylinder 73 being capable of rotating and also moving longitudinally within the bore of the sleeve 72. At its upper end the cylinder 73 is provided with an integral upper end head 74 having a bore 75 in which the upper end 76 of a piston rod slides, this piston rod being connected with a piston 77 working within the cylinder chamber 78 of the cylinder 73. A downward extension 79 of this piston rod slides in a bore 80 provided in a lower end head 81 of the cylinder 73 and this downward extension 79 of the piston rod is provided with a longitudinal groove 82 into which the end of a pin 83 extends, this pin being mounted in a tubular extension 84 of the lower end head 81 of the cylinder so that the piston rod is prevented from turning relative to the cylinder 73 and its end heads 74 and 81.

Air for elevating the piston 77 and its piston rod 76, 79 is supplied to the lower end of the cylinder chamber 78 by an air pressure supply line 85, this air being supplied under control of a valve 86 mounted upon the floor and operated by means of a treadle 87, the operator stepping upon the treadle 86 to admit air under pressure to the lower end of the cylinder chamber 78 and elevate the piston 77 together with its piston rod 76, 79.

When the treadle actuated valve 86 is so actuated the upper end of the cylinder chamber 73 is opened to the atmosphere, the air escaping through a line 88 which communicates through a duct 89 with the upper part of the cylinder chamber 73 and also connects with the valve 86. When the operator releases the treadle 87, the conditions are reversed, air under pressure being supplied through the pipe 88 and duct 89 to the upper end of the cylinder chamber 73 and the air below the piston 77 being exhausted through the pipe 85. To the upper end of the upper head 74 of the cylinder 73 is secured, as by screws 90, an inverted cup-shaped holder 91 having a bore 92 and also having an opening 93 through which the stem of the pin or workpiece is provided into engagement with the cutter 46.

In this bore 92 is slidingly fitted a cylindrical follower 95, this follower also having an opening 96 at its upper end through which the stem of the pin being operated upon is projected and the lower end of this follower having an outwardly projecting peripheral flange 99 which is arranged in a larger bore 97 provided in the upper end of the upper end head 74 of the cylinder. This follower is yieldingly held in its depressed position shown in Fig. 7 by a helical compression spring 98 which is interposed between the cup-shaped holder 91 and the flange 99 of the follower 95.

The bore 100 of the follower 95 registers with the bore 75 provided in the upper end head 74 of the cylinder 73 for the upper end 76 of the piston rod and this bore 100, in the follower, as best shown in Fig. 7, is of the same size as the piston rod bore so that the upper end 76 of the piston rod is capable of being projected into the bore 100 of the spring 98 as best shown in Fig. 4. The upper end of the upper part 76 of the piston rod is provided with a rounding screw driver ridge 105 which is adapted to fit into the screw driver slot 25 of the pin or workpiece so as to hold the workpiece against turning relative to the piston rod while the bayonet slot is being cut therein. In order to position the workpiece on the upper end of the piston rod 76 and in proper register with the rounding screw driver ridge a feeding mechanism is provided which is preferably constructed as follows:

The numeral 110 represents a supporting plate or bracket which is secured to a cam plate 111, this cam plate being in turn fast to the upper end of the stationary sleeve 72 which carries the cylinder 73. This supporting plate or bracket projects forwardly toward the operator and is formed to provide a flat feeding groove 112 on its upper side, this feeding groove registering with a feeding opening 113 extending through the upper end head 74 and to the bore 75 therein. Near its center a screw driver ridge or projection 115 rises from the bottom of the feeding slot 112, this ridge rounding to conform to the rounding screw driver slot 25 in the workpiece and being arranged parallel with the sides of the slot 112. The operator places the pin or workpiece in the feeding groove 112 with its screw driver slot 25 over the screw driver ridge 115 and then manually moves the pin or workpiece along the feeding slot 112 by means of a pusher comprising a flat bar 118 slidingly fitting in the feeding groove 112 and having forked ends 119 which ride alongside the screw driver ridge 115. This pusher is provided with a handle 120 and is held in the feeding groove 112 by a plate 121 which is mounted on the supporting bracket 110 and extends over the feeding groove 112 so as to retain the feeding bar 118 therein. The inward movement of the pusher or feeding bar 118 is limited by a pin 123 which engages the plate 121 in the extreme inward position of the pusher.

The upper cylinder head 74 is cut away, as indicated at 125, to provide a through passage for the workpieces and to arrest the workpieces in a position above the upper piston rod 76 a movable stop bar 126 is pivoted in the cutout 125 in the upper cylinder head 74, this stop 126, in the position shown in Fig. 6, forming an abutment for the workpiece 20 on the upper end of the upper piston rod 76. To move the pivoted stop 126 to the position shown in Fig. 6 when one of the pins 20 is being fed to the machine, the handle 120 of the pusher is provided with a rod 128 which engages the outer end 129 of the pivoted stop 126 so that when the pusher is moved inwardly the rod 128 engages the pivoted stop 126 to move it from the position shown in Fig. 5 to that shown in Fig. 6.

The bayonet slot 28 is cut in the workpiece 20 by manually rotating the cylinder 73 and also moving it upwardly while the cutter 46 is in engagement with the workpiece. For this purpose the upper face of the cam plate 111 is formed to provide a cam 130 which conforms to the desired shape of the bayonet slot 28 and on which a roller 131 rides. This roller, as best shown in Fig. 4, is carried by a pin 132 which is screwed into the upper head 74 of the cylinder 73. This upper head 74 of the cylinder 73 is also provided with a handle 135 by means of which the cylinder 73 is manually rotated, the endwise movement of the cylinder, in forming the bayonet slot, being effected by the roller 131 engaging the stationary cam face 130.

The cylinder 73 is yieldingly held in a depressed position and its roller 131 in engagement with the stationary cam face 130 by a series of helical compression springs 140 arranged under the supporting plate 71 and interposed between a thrust bearing 141 on the underside of the plate 71 and a thrust head 142 secured to the lower end of the tubular extension 84 of the lower end head 81 of the cylinder 73.

After the work upon the pin or workpiece 20 has been performed, pneumatic means are provided for ejecting the same from the machine. For this purpose a foot operated valve 150 is mounted on the floor adjacent to the valve 86 and is connected by an air pressure pipe 151 to a gooseneck pipe 152 mounted on the head 34 and having its discharge directed into the feeding opening 113 of the upper head 74 of the cylinder 73. After the operation of cutting the bayonet slot 28 in the workpiece has been completed, the operator steps on the valve 150, thereby to admit a blast of air into the feeding opening 113 of the cylinder head 74 and to blow the workpiece out through the cutout portion 125, the pivoted stop 126 swinging to the position shown in Fig. 11 under the pressure of the air. The workpiece is shown as blown into a large tube 158 which can be secured in any suitable manner to aline with the path of the workpiece being so blown out of the machine and which is shown as discharging the workpieces into a basket 159 on the stand or table 30 of the machine.

*Operation*

The machine is designed to cut a bayonet slot 28 in a blank pin, as shown in Fig. 2, and in predetermined relation to the screw driver slot 25 provided on the underside of this blank. The operator places one of these blanks in the feeding slot 112 on the upper side of the bracket 110 and places its rounding screw driver slot 25 over the rounding screw driver ridge 115 in the center of the feeding slot 112. The position of the parts at this time is illustrated in Fig. 5.

The operator then pushes on the handle 120 of the pusher 118. This pusher comprises the forked bar 118 in the feeding slot 112 and this inward movement of the pusher thereby shoves the workpiece along the feeding slot 112 into the feeding opening 113 in the upper head 74 of the cylinder 73. At this time the rounding screw driver ridge 105 on the upper end of the piston rod 76 is in alinement with the similar ridge 115 on which the operator placed the workpiece and therefore the workpiece is pushed into a position where it rests on top of the piston rod 76 with its screw driver slot 25 in engagement with the screw driver ridge 105 on the upper end of the piston rod. The workpiece is prevented from being pushed too far by the pivoted stop 126. At the start of the feeding operation, as shown in Fig. 5, this pivoted stop is open but when the pusher 118 is moved forwardly to position the workpiece on top of the piston rod 76 the pusher rod 128 engages the outer end 129 of the pivoted stop 126 so as to swing it to the position shown in Fig. 6. In this position the pivoted stop 126 forms a positive stop for locating the workpiece in exact concentric relation to the piston rod 76.

The operator then steps upon the treadle 87. This actuates the valve 86 to supply pressure through the pipe 85 to the lower end of the cylinder chamber 78 and to exhaust the air from the upper end thereof through the duct 89 and pipe 88. The air pressure against the underside of the piston 77 thereby raises the piston and its piston rods 76 and 79, these piston rods being prevented from turning relative to the piston by the pin 83 which engages the slot 82 of the lower piston rod 79, as best shown in Fig. 4. Since the workpiece is carreid by the upper end of the upper piston rod 76, this movement of the piston 77 elevates the workpiece 20 through the bore 75 and into the bore 100 of the follower 95, as illustrated in Figs. 4 and 7.

The upper end of the workpiece 20 is projected through the opening 96 in the follower 95 and its flange 22 is brought into engagement with the follower immediately under and around this opening 96. The continued upward movement of the piston rod 76 thereby causes an upward movement of the follower 95, through the medium of the workpiece 20, this upward movement of the follower in the bore 92 of the cup-shaped head 91 being against the resistance of the helical compression spring 98. In the extreme upper position of the parts the upper end of the follower 95 engages with the top of the cup-shaped part 91 and the stem of the workpiece is projected through the opening 93 in this cup-shaped part 91. At this time the upper end of the workpiece is arranged in the central opening of the piece 58 of sheet metal and in close relation to the rotating cutter 46 but not in engagement therewith.

This cutter 46 is being continuously rotated through the belt 51, as shown in Fig. 1, this belt engaging the pulley 50 which in turn is fast to the left hand chuck spindle 40, as viewed in Fig. 4, and which is in turn journaled in the left hand pair of bearings 39. The cutter 46 is made of hardened drill rod with three spiral cutting grooves provided at its center and one end is held by the left hand chuck jaw 42 so as to rotate with the left hand spindle 40. Its opposite end is held by the right hand chuck jaw 42 of the right hand spindle 40, as viewed in Fig. 4, this spindle being journaled in the right hand pair of ball bearings 39 so that the cutter 46 is rotatably supported at its opposite ends and rotated through power supplied through the pulley 50. While the cutter is so rotating cutting oil is supplied from the pipe 61 to the right hand end of the cutter 46 and into the small chamber formed by the piece 58 of sheet metal which is secured to the underside of the block 55 and encloses the cutter 46. This cutting oil, together with the chips developed during cutting, are sucked out of this small chamber by the suction line 63 and passage 62, this suction also being sufficiently powerful to draw air in through the central opening in the piece 58 of sheet metal so that no dripping or loss of cutting oil occurs around the cutter. This last opening in the piece 58 of sheet metal is provided, of course, to permit the workpiece 20 to be brought into engagement with the cutter 46.

The operator then turns the handle 135. This handle is secured to the upper end head 74 of the cylinder 73 and thereby rotates the cylinder. This upper end head 74 of the cylinder carries the roller 131 which is held in engagement with the upper cam face 130 of the cam plate 111 by the helical compression springs 140 which, as best shown in Fig. 4, yieldingly hold the cylinder 73 in a depressed position and bear against a thrust bearing 141 on the underside of the stationary plate 71. As the operator rotates the cylinder 73 a corresponding rotation of the piston rods 76, 79 is also effected, inasmuch as the cylinder 73 and these piston rods are compelled to rotate in unison through the medium of the pin 83 in the groove 82 of the lower piston rod 79, as best shown in Fig. 4. While the cylinder 73 is so being turned, its roller 131 rides up on the salient part of the cam face 130 and thereby moves the cylinder 73 and the piston rod 76 upwardly against the resistance of the springs 140 and into engagement with the rotating cutter 46. The relation between the rotating and endwise movements of the cylinder 73 and piston rod 76 is determined by the shape of the cam face 130, this cam face being formed to provide exactly the shape of bayonet slot 28 desired in the finished product. Further, since the workpiece 20 is held in predetermined relation to the upper piston rod 76 by virtue of the screw driver slot and ridge connection between the two, and since the cylinder 73 and upper piston rod 76 are maintained in predetermined relation to the stationary cam face 130, it will be seen that the bayonet slot 28 is provided in a predetermined relation to the screw driver slot 25 of the workpiece so that all of the finished pins are identical in this regard.

The operator then rotates the handle 135 back to its original position. This serves to withdraw the workpiece from the rotating cutter 46, the roller 131 riding in a reverse direction on the stationary cam face 130 so that the cutter follows the cut which it has made in the workpiece during this withdrawal. The parts are thereby returned to the position shown in Fig. 4 in which the cutter 46 is out of engagement with the workpiece.

The operator then releases the foot treadle 87 thereby to actuate the valve 86 so as to supply air pressure through the pipe 88 and duct 89 to the upper side of the cylinder chamber 79 and so as to exhaust the air from the underside of the piston 77 therein through the pipe 85. This causes the piston 77 to move downwardly, the finished article being thereby returned to the position shown in Fig. 7. In this downward movement the workpiece 20 remains on top of the upper piston rod 76 and in the first part of this downward movement the follower 95 moves downwardly with the workpiece and the piston rod. The helical return spring 98 of the follower thereby serves to positively draw the shank of the pin through the opening 93 in the cup-shaped part 91 at the upper end of the cylinder head 74 so that if the workpiece were burred during the cutting operation these burrs do not interfere with the retraction of the workpiece through the opening 93. The continued downward movement of the parts causes the follower to come to rest at the bottom of the bore 97, as best shown in Fig. 7, and the continued downward movement of the piston rod brings the workpiece to the position shown in Fig. 7 in which it is in line with the feeding opening 113 of the upper cylinder head 74 and with the cutout 125. The operator thereupon steps on the valve 150. This admits air under pressure through the line 151 to the gooseneck 152. As best shown in Figs. 1 and 11, the discharge of this gooseneck 152 is in line with the feeding opening 113 in the upper head 74 of the cylinder and the blast of air thereby blows the pivoted stop 126 to the open position shown in Fig. 11 and blows the workpiece out through the cutout portion 125 of the upper cylinder head 74. The tube 158, as shown in Fig. 1, alines with the path of discharge of the workpiece being so blown out of the apparatus and deposits the finished workpiece into the basket 159. This returns the parts to proper position for feeding another workpiece to the machine and the same cycle of operations is repeated.

From the foregoing it will be seen that the present invention provides a machine for accurately cutting a bayonet slot of predetermined form and in a predetermined position in a pin of the character shown; which will cut such bayonet slots rapidly; in which there is no dripping or loss of cutting oil; in which the blanks can readily be fed to the apparatus and are rapidly ejected therefrom; and in which the machine is of simple construction considering the function which it performs and will stand up under conditions of severe and constant use without getting out of order or requiring repairs.

I claim:

1. A machine of the character described for cutting metal parts, comprising a frame, a cutter mounted on said frame and rotating about a horizontal axis, a holder mounted on said frame below said cutter and having its upper end formed to hold the metal part to be cut, manually controlled fluid pressure means for elevating said holder to bring the metal part to be cut to a position adjacent said cutter, and means for further elevating said holder to bring the metal part to be cut into engagement with said cutter and rotating said holder about a vertical axis while said metal part is in engagement with said cutter.

2. A machine of the character described for cutting metal parts, comprising a frame, a cutter mounted on said frame and rotating about a horizontal axis, a vertical cylinder mounted on said frame below said cutter, a piston in said cylinder, a vertical piston rod connected with said piston and extending coaxially through said cylinder and having its upper end extending outwardly from said cylinder, means at the upper end of said piston rod for holding the metal part to be cut, valve means for admitting fluid pressure into the lower end of said cylinder to elevate said piston and piston rod and bring the metal part to be cut into a position adjacent said cutter, means for rotating said holder about a vertical axis and means for further elevating said holder while said metal part is in engagement with said cutter through motion derived from said last means.

3. A machine of the character described for cutting metal parts, comprising a frame, a cutter mounted on said frame and rotating about a horizontal axis, a vertical cylinder mounted on said frame below said cutter, a piston in said cylinder, a vertical piston rod connected with said piston and extending coaxially through said cylinder and having its upper end extending outwardly from said cylinder, means at the upper end of said piston rod for holding the metal part to be cut, valve means for admitting fluid pressure into the lower end of said cylinder to elevate said piston and piston rod and bring the metal part to be cut into a position adjacent said cutter, means for rotating sold holder about a vertical axis and cam means for further elevating said holder while said metal part is in engagement with said cutter through motion derived from said last means.

4. A machine of the character described for cutting metal parts, comprising a frame, a cutter mounted on said frame and rotatable about a horizontal axis, a vertical cylinder mounted on said frame below said cutter to rotate about its vertical axis, a piston in said cylinder, a vertical piston rod connected with said piston and extending coaxially through said cylinder and having its upper end extending outwardly from said cylinder, means permitting said piston rod to move axially relative to said cylinder but compelling said piston rod and cylinder to rotate in unison, the upper end of said piston rod being formed to hold the metal part to be cut, valve means for admitting fluid pressure into the lower end of said cylinder to elevate said piston and piston rod and bring the metal part to be cut into a position adjacent to said cutter, means for rotating said cylinder about its axis, and means for further elevating said cylinder to bring said part to be cut into engagement with said cutter while being rotated by said last means.

5. A machine of the character described for cutting metal parts, comprising a frame, a cutter mounted on said frame and rotatable about a horizontal axis, a stationary vertical sleeve mounted on said frame below said cutter, a cylinder fitted in said sleeve for axial and rotatable movement therein, said cylinder being provided with cylinder heads at its upper and lower ends, a piston in said cylinder, a vertical piston rod connected with said piston and having its upper end extending through the upper end head of said cylinder, means permitting said piston rod to move axially relative to said cylinder but compelling said piston rod and cylinder to rotate in unison, a member mounted on said upper end head of said cylinder and forming the upper jaw of a holder for holding the metal part to be cut, the lower jaw of said holder being formed by the upper end of said piston rod, means for feeding the metal part to be cut onto said upper end of said piston rod while in a lowered position, valve means for admitting fluid pressure into the lower end of said cylinder to elevate said piston and piston rod and bring the metal part to be cut into engagement with the upper jaw of said holder and into a position adjacent said cutter, and means for rotating said cylinder about its axis and further moving said cylinder axially upward to bring said metal part to be cut into engagement with said cutter.

6. A machine of the character described for cutting metal parts having a shank and a flange extending radially outward from said shank, comprising a frame, a cutter mounted on said frame and rotating about a horizontal axis, a vertical cylinder mounted on said frame below said cutter to rotate about its vertical axis, said cylinder being provided with cylinder heads at its upper and lower ends, a piston in said cylinder, a vertical piston rod connected with said piston and having its upper end extending through the upper end head of said cylinder, means permitting said piston rod to move axially relative to said cylinder but compelling said piston rod and cylinder to rotate in unison, a vertical cup-shaped member mounted on the upper end head of the cylinder and having a bore leading to an upper end wall thereof and having an opening extending centrally through said upper end wall, a cylindrical follower mounted in said bore and having a bore in which the upper end of said piston rod is fitted, said follower being provided with a wall at its upper end and having an opening registering with the opening in the upper wall of said cup-shaped member, spring means yieldingly holding said follower in a depressed position relative to said cup-shaped member, means for feeding the flange of the metal part to be cut onto the upper end of said piston rod while in a lowered position, valve means for admitting fluid pressure into the lower end of said cylinder to elevate said piston and piston rod and to bring the flange of the metal part to be cut into engagement with the underside of the upper wall of said follower and to project the stem of said metal part to be cut through said openings into a position adjacent said cutter and to bring the upper end of said follower into engagement with the upper end of said cup-shaped member, and means for rotating said cylinder and moving said cylinder axially upward in said sleeve to bring the stem of the metal part to be cut into engagement with said cutter.

7. A machine of the character described for cutting metal parts, comprising a frame, a cutter mounted on said frame and rotatable about a horizontal axis, a stationary vertical sleeve mounted on said frame below said cutter, a cylinder fitted in said sleeve for axial and rotatable movement therein, said cylinder being provided with cylinder heads at its upper and lower ends, a piston in said cylinder, a vertical piston rod connected with said piston and having its upper end extending through the upper end head of said cylinder, means permitting said piston rod to move axially relative to said cylinder but compelling said piston rod and cylinder to rotate in unison, a member mounted on said upper end head of said cylinder and forming the upper jaw of a holder for holding the metal part to be cut, the lower jaw of said holder being formed by the upper end of said piston rod, means for fitting the metal part to be cut onto said upper end of said piston rod while in a lowered position, valve means for admitting fluid pressure into the lower end of said cylinder to elevate said piston and piston rod and bring the metal part to be cut into engagement with the upper jaw of said holder and into a position adjacent said cutter, and means for rotating said cylinder about its axis and further moving said cylinder axially upward to bring said metal part to be cut into engagement with said cutter comprising an annular cam mounted on said sleeve concentric therewith, a roller mounted on said piston and engaging said cam, and a handle projecting outwardly from the upper end head of said piston.

8. A machine of the character described for cutting metal parts, comprising a frame, a cutter comprising a drill rod having spiral threads cut therein and mounted on said frame to rotate about a horizontal axis, means forming a small chamber around said cutter and having an opening in its underside through which the metal part to be cut is fed upwardly into engagement with said cutter, means for feeding the metal part to be cut upwardly through said opening into said chamber and into engagement with said cutter, means for feeding a supply of cutting oil into said chamber at one end of said cutter, and suction means connected with said chamber at the opposite end of said cutter for sucking the cutting oil and the chips formed during the cutting operation out of said chamber.

9. A machine of the character described for cutting metal parts, comprising a frame, a block mounted on said frame and having a recess in its underside, a cutter mounted on said frame to rotate about a horizontal axis and comprising a drill rod having spiral threads cut therein and arranged in said recess, a plate secured to the underside of said block and enclosing said recess and the part of the cutter therein, said plate being provided with an opening therethrough through which the metal part to be cut is fed upwardly into engagement with said cutter, means for feeding the metal part to be cut upwardly through said opening into said recess and into engagement with said cutter, means for feeding cutting oil into said recess at one end of said cutter, and suction means connected with said recess at the opposite end of said cutter for sucking the cutting oil and chips formed during the cutting operation out of said recess.

10. In a machine of the character described for cutting metal parts, means for feeding the metal part to be cut onto a holder, comprising a member surrounding the upper end of said holder and having a feed opening extending horizontally therethrough to said holder and a discharge opening extending horizontally therethrough from said holder and in line with said feed opening, a door pivoted on said member and swinging across said discharge opening and forming a stop to position said metal part to be cut on said holder, a pusher mounted to feed the metal part to be cut through said feed opening and onto said holder, and means actuated through motion derived from said pusher to close said door when said metal part is pushed onto said holder, and means for opening said door and discharging said metal part through said discharge opening.

11. In a machine of the character described for cutting metal parts, means for feeding the metal part to be cut onto a holder, comprising a member surrounding the upper end of said holder and having a feed opening extending horizontally therethrough to said holder and a discharge opening extending horizontally therethrough from said holder and in line with said feed opening, a door pivoted on said member to swing about a vertical axis across said discharge opening and forming a stop to position said metal part to be cut on said holder, a pusher mounted to feed the metal part to be cut through said feed opening and onto said holder, and an extension on said pusher and engaging said door to close said door when said part is pushed onto said holder, and means for opening said door and discharging said metal part through said discharge opening.

12. In a machine of the character described for cutting metal parts, means for feeding the metal part to be cut onto a holder, comprising a member surrounding the upper end of said holder and having a feed opening extending horizontally therethrough to said holder and a discharge opening extending horizontally therethrough from said holder and in line with said feed opening, a door pivoted on said member to swing about a vertical axis across said discharge opening and forming a stop to position said metal part to be cut on said holder, said door being provided with an extension projecting beyond its axis, a horizontal bracket mounted on said part and provided with a horizontal guideway in line with said feed opening, a pusher slidingly mounted in said guideway and formed to feed the metal part to be cut through said feed opening and onto said holder, and a push rod mounted on said pusher and engaging said extension of said door to close said door when said part is pushed onto said holder, and means for opening said door and discharging said metal part through said discharge opening.

13. A machine of the character described for cutting metal parts, comprising a frame, a cutter mounted on said frame and rotating about an axis, a vertical rod mounted for longitudinal movement on said frame below said cutter and having its upper end formed to hold the metal part to be cut, means for elevating said rod to bring the metal part to be cut into engagement with said cutter, means for feeding the metal part to be cut onto the upper end of said rod, comprising a member surrounding the upper end of said rod and having a vertical bore in which said rod slides and having a feed opening extending horizontally therethrough to said bore and having a discharge opening extending horizontally therethrough from said bore and in line with said feed opening, a door pivoted on said member to swing about a vertical axis across said discharge opening and forming a stop to position said metal part to be cut on said holder, a pusher mounted to feed the metal part to be cut through said feed opening and onto said rod, and an extension on said pusher and engaging said door to close said door when said part is pushed onto said holder and means for opening said door and discharging said metal part through said discharge opening.

14. A machine of the character described for cutting metal parts, comprising a frame, a cutter mounted on said frame and rotating about an axis, a holder for the metal part to be cut, a member surrounding said holder and having a feed opening extending therethrough to said holder and a discharge opening extending therethrough from said holder in line with said feed opening, means for feeding the metal part to be cut through said feed opening into engagement with said holder, means for moving said holder to bring the metal part to be cut into engagement with said cutter, and means for discharging said metal part through said discharge opening comprising a conduit having its discharge arranged adjacent said feed opening and means for admitting compressed air to said conduit to blow said metal part out through said discharge opening.

15. A machine of the character described for cutting metal parts, comprising a frame, a cutter mounted on said frame and rotating about an axis, a vertical rod mounted for longitudinal movement on said frame below said cutter and having its upper end formed to hold the metal part to be cut, means for elevating said rod to bring the metal part to be cut into engagement with said cutter, a member surrounding the upper end of said rod and having a bore in which said rod slides and having a feed opening extending horizontally therethrough to said bore and having a discharge opening extending horizontally therethrough from said bore and in line with said feed opening, means for feeding the metal part to be cut through said feed opening onto said rod, and means for discharging said metal part to be cut through said discharge opening comprising a conduit having its discharge arranged adjacent said feed opening and means for admitting compressed air to said conduit to blow said metal part out through said discharge opening.

16. In a machine of the character described for cutting metal parts, means for feeding the metal part to be cut onto a holder, comprising a member surrounding the upper end of said holder and having a feed opening extending horizontally therethrough to said holder and a discharge opening extending horizontally therethrough from said holder and in line with said feed opening, a door pivoted on said member and swinging across said discharge opening and forming a stop to position said metal part to be cut on said holder, a pusher mounted to feed the metal part to be cut through said feed opening and onto said holder, and means actuated through motion derived from said pusher to close said door when said metal part is pushed onto said holder, and means for opening said door and discharging said metal part through said discharge opening, comprising a conduit having its discharge directed toward said feed opening and means for admitting compressed air to said conduit to blow said door open and to blow said metal part out through said discharge opening.

RICHARD FAUSER.